United States Patent
Rached

(10) Patent No.: US 11,370,948 B2
(45) Date of Patent: *Jun. 28, 2022

(54) TETRAFLUOROPROPENE-BASED COMPOSITION

(71) Applicant: Arkema France, Colombes (FR)

(72) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 197 days.

This patent is subject to a terminal disclaimer.

(21) Appl. No.: 16/494,413

(22) PCT Filed: Mar. 20, 2018

(86) PCT No.: PCT/FR2018/050669
§ 371 (c)(1),
(2) Date: Sep. 16, 2019

(87) PCT Pub. No.: WO2018/172687
PCT Pub. Date: Sep. 27, 2018

(65) Prior Publication Data
US 2021/0115312 A1    Apr. 22, 2021

(30) Foreign Application Priority Data
Mar. 21, 2017    (FR) .................................... 1752303

(51) Int. Cl.
C09K 5/04    (2006.01)
(52) U.S. Cl.
CPC ........ *C09K 5/045* (2013.01); *C09K 2205/126* (2013.01); *C09K 2205/22* (2013.01); *C09K 2205/43* (2013.01); *C09K 2205/47* (2013.01)
(58) Field of Classification Search
CPC ............ C09K 5/02; C09K 5/04; C09K 5/041; C09K 5/044; C09K 5/045; C09K 2205/122; C09K 2205/126; C09K 2205/22; C09K 2205/40; C09K 2205/43; C09K 2205/47
USPC .................................................. 252/67, 68
See application file for complete search history.

(56) References Cited

U.S. PATENT DOCUMENTS

| | | | |
|---|---|---|---|
| 2,438,120 A | 3/1948 | Freygang | |
| 2,834,748 A | 5/1958 | Bailey et al. | |
| 2,846,458 A | 8/1958 | Haluska | |
| 2,917,480 A | 12/1959 | Bailey et al. | |
| 5,056,990 A | 10/1991 | Nakajima | |
| 5,290,466 A | 3/1994 | Shiflett | |
| 5,363,674 A | 11/1994 | Powell | |
| 5,399,631 A | 3/1995 | Egawa et al. | |
| 5,497,631 A | 3/1996 | Lorentzen et al. | |
| 5,643,492 A | 7/1997 | Shiflett | |
| 5,688,432 A | 11/1997 | Pearson | |
| 5,722,256 A | 3/1998 | Shiflett | |
| 5,744,052 A | 4/1998 | Bivens | |
| 6,454,960 B1 | 9/2002 | Sunaga et al. | |
| 6,508,950 B1 | 1/2003 | Lim et al. | |
| 6,589,355 B1 | 7/2003 | Thomas et al. | |
| 6,655,160 B2 | 12/2003 | Roberts | |
| 7,569,170 B2* | 8/2009 | Minor .................... | C09K 5/045 252/68 |
| 7,914,696 B2 | 3/2011 | Low et al. | |
| 8,070,977 B2 | 12/2011 | Rached | |
| 8,075,798 B2 | 12/2011 | Rached | |
| 8,142,680 B2 | 3/2012 | Rached | |
| 8,246,850 B2 | 8/2012 | Rached | |
| 8,443,624 B2 | 5/2013 | Yamashita et al. | |
| 8,496,845 B2* | 7/2013 | Tsuchiya ................ | C09K 5/045 252/67 |
| 8,709,275 B2 | 4/2014 | Yana Motta et al. | |
| 8,980,118 B2 | 3/2015 | Yana Motta et al. | |
| 8,992,793 B2* | 3/2015 | Sato ....................... | C09K 5/045 252/68 |
| 9,057,010 B2* | 6/2015 | Rached .................. | C09K 5/045 |
| 9,359,540 B2* | 6/2016 | Rached .................. | C09K 5/045 |
| 9,488,398 B2* | 11/2016 | Rached .................. | C09K 5/045 |
| 9,556,372 B2* | 1/2017 | Kujak .................... | C09K 5/045 |
| 9,598,621 B2 | 3/2017 | Minor et al. | |
| 9,683,156 B2 | 6/2017 | Rached | |
| 9,752,069 B2 | 9/2017 | Boussand | |
| 10,113,093 B2 | 10/2018 | Rached | |

(Continued)

FOREIGN PATENT DOCUMENTS

| | | |
|---|---|---|
| CN | 101297016 A | 10/2008 |
| CN | 101880519 A | 11/2010 |

(Continued)

OTHER PUBLICATIONS

International Search Report (PCT/ISA/210) dated May 29, 2018, by the European Patent Office as the International Searching Authority for International Application No. PCT/FR2018/050669.
Written Opinion (PCT/ISA/237) dated May 29, 2018, by the European Patent Office as the International Searching Authority for International Application No. PCT/FR2018/050669.
U.S. Appl. No. 16/494,445, Rached.
International Search Report and Written Opinion issued in PCT/FR2018/050671 (English and French language versions) dated Jun. 12, 2018, 16 pages, European Patent Office, Rijswijk, NL.
Takizawa, K., et al., "Flammability Assessment of $CH_2=CFCF_3$: Comparison with Fluoroalkenes and Fluoroalkanes", Journal of Hazardous Materials, vol. 172, No. 2-3, Aug. 18, 2009, pp. 1329-1338, XP026719989, Elsevier B.V.

(Continued)

*Primary Examiner* — Matthew R Diaz
(74) *Attorney, Agent, or Firm* — Buchanan Ingersoll & Rooney P.C.

(57) ABSTRACT

A composition including between 4 and 6 wt. % of difluoromethane, between 2.5 and 3.5 wt. % of pentafluoroethane, and between 91 and 93.5 wt. % of tetrafluoropropene. The use of the composition as replacement for R404A, R452A, R22, R134a, R245fa, R152a, R422, R502, R407A, R407F, R407C, R1234yf or R1234ze. A heat-transfer composition including the composition and at least one additive chosen from nanoparticles, stabilizing agents, surfactants, tracing agents, fluorescent agents, odorous agents, lubricants, and solubilizing agents.

17 Claims, No Drawings

(56) References Cited

U.S. PATENT DOCUMENTS

| | | | |
|---|---|---|---|
| 10,308,853 B2* | 6/2019 | Andre | C09K 5/044 |
| 2006/0025322 A1 | 2/2006 | Wilson et al. | |
| 2006/0243944 A1 | 11/2006 | Minor et al. | |
| 2006/0243945 A1 | 11/2006 | Minor et al. | |
| 2006/0269484 A1 | 11/2006 | Knopeck et al. | |
| 2007/0108403 A1 | 5/2007 | Sievert et al. | |
| 2008/0230738 A1 | 9/2008 | Minor et al. | |
| 2009/0158771 A1 | 6/2009 | Low et al. | |
| 2009/0249864 A1 | 10/2009 | Minor et al. | |
| 2009/0250650 A1 | 10/2009 | Minor et al. | |
| 2009/0278072 A1 | 11/2009 | Minor et al. | |
| 2009/0305876 A1 | 12/2009 | Singh et al. | |
| 2009/0314015 A1 | 12/2009 | Minor et al. | |
| 2010/0044619 A1 | 2/2010 | Hulse et al. | |
| 2010/0044620 A1 | 2/2010 | Rached | |
| 2010/0122545 A1 | 5/2010 | Minor et al. | |
| 2011/0079042 A1 | 4/2011 | Yamashita et al. | |
| 2011/0095224 A1 | 4/2011 | Rached | |
| 2011/0108756 A1 | 5/2011 | Tsuchiya et al. | |
| 2011/0162410 A1 | 7/2011 | Low | |
| 2011/0173997 A1 | 7/2011 | Low et al. | |
| 2011/0186772 A1 | 8/2011 | Rached | |
| 2011/0219791 A1 | 9/2011 | Rached | |
| 2011/0219792 A1 | 9/2011 | Rached | |
| 2011/0219815 A1 | 9/2011 | Yana Motta et al. | |
| 2011/0240254 A1 | 10/2011 | Rached | |
| 2011/0284181 A1 | 11/2011 | Rached | |
| 2011/0289748 A1 | 12/2011 | Singh et al. | |
| 2012/0049104 A1 | 3/2012 | Rached | |
| 2012/0056123 A1 | 3/2012 | Rached | |
| 2012/0097885 A9 | 4/2012 | Hulse et al. | |
| 2012/0144857 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0255316 A1* | 10/2012 | Andre | C09K 5/044 |
| | | | 252/67 |
| 2012/0312048 A1 | 12/2012 | Poole et al. | |
| 2013/0055733 A1 | 3/2013 | Rached | |
| 2013/0055738 A1 | 3/2013 | Rached | |
| 2013/0055739 A1 | 3/2013 | Rached | |
| 2013/0061613 A1 | 3/2013 | Rached | |
| 2013/0096218 A1* | 4/2013 | Rached | C09K 5/045 |
| | | | 252/68 |
| 2013/0145778 A1 | 6/2013 | Yana Motta et al. | |
| 2013/0193369 A1* | 8/2013 | Low | C09K 5/045 |
| | | | 252/68 |
| 2013/0255284 A1 | 10/2013 | Rached | |
| 2014/0075969 A1 | 3/2014 | Guerin et al. | |
| 2014/0137578 A1* | 5/2014 | Yana Motta | C09K 5/045 |
| | | | 252/67 |
| 2014/0223927 A1* | 8/2014 | Pottker | C09K 5/045 |
| | | | 252/67 |
| 2014/0331697 A1 | 11/2014 | Minor et al. | |
| 2015/0135765 A1 | 5/2015 | Yana Motta et al. | |
| 2015/0152307 A1 | 6/2015 | Rached | |
| 2015/0184052 A1 | 7/2015 | Rached | |
| 2015/0291869 A1 | 10/2015 | Boussand | |
| 2016/0145481 A1 | 5/2016 | Kujak et al. | |
| 2016/0215192 A1 | 7/2016 | Minor et al. | |
| 2016/0222272 A1 | 8/2016 | Rached | |
| 2016/0252283 A1 | 9/2016 | Rached | |
| 2017/0260437 A1 | 9/2017 | Rached | |
| 2019/0016937 A1 | 1/2019 | Andre et al. | |

FOREIGN PATENT DOCUMENTS

| | | |
|---|---|---|
| EP | 0 509 673 A1 | 10/1992 |
| EP | 0 811 670 A1 | 12/1997 |
| EP | 2 767 569 A1 | 8/2014 |
| FR | 2959998 A1 | 11/2011 |
| KR | 2001-0044992 A | 6/2001 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2007/002625 A2 | 1/2007 |
| WO | WO 2007/002625 A3 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2008/107623 A2 | 9/2008 |
| WO | WO 2008/107623 A3 | 9/2008 |
| WO | WO 2009/047542 A1 | 4/2009 |
| WO | WO 2009/104784 A1 | 8/2009 |
| WO | WO 2009/151669 A1 | 12/2009 |
| WO | WO 2009/154149 A1 | 12/2009 |
| WO | WO 2010/002014 A1 | 1/2010 |
| WO | WO 2010/002020 A1 | 1/2010 |
| WO | WO 2010/058126 A1 | 5/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/129461 A2 | 11/2010 |
| WO | WO 2010/129461 A3 | 11/2010 |
| WO | WO 2010/129920 A1 | 11/2010 |
| WO | WO 2011/023923 A1 | 3/2011 |
| WO | 2011073934 A1 | 6/2011 |
| WO | WO 2011/077088 A1 | 6/2011 |
| WO | WO 2011/107698 A2 | 9/2011 |
| WO | WO 2011/107698 A3 | 9/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |
| WO | WO 2012/069725 A1 | 5/2012 |
| WO | WO 2012/150391 A1 | 11/2012 |
| WO | WO 2012/177742 A2 | 12/2012 |
| WO | WO 2014/081539 A1 | 5/2014 |

OTHER PUBLICATIONS

Takizawa, K., et al., "Flammability Assessment of $CH_2=CFCF_3$ (R-1234yf) and its Mixtures with $CH_2F_2$ (R-32); 2010 International Symposium on Next-generation Air Conditioning and Refrigeration Technology," Tokyo, JP, Feb. 17-19, 2010, pp. 1-8.

"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.

Donnelly, M. K., et al., "The Flammability of R-245ca", ASHRAE Transactions: Symposia (American Society of Heating, Refrigerating and Air-Conditioning Engineers), 1999, 10 pages, including pp. 1169-1176, Ashrae, USA.

Van Den Schoor, Filip, University Thesis, "Influence of Pressure and Temperature on Flammability Limits of Combustible Gases in Air," May 2007, 228 pages, Katholieke Universiteit Leuven—Faculteit Ingenieurswetenschappen, Leuven, BE, ISBN 978-90-5682-813-4.

Rached, Wissam, U.S. Appl. No. 16/494,445 entitled "Method for Heating and/or Air-Conditioning in a Vehicle," filed in the U.S. Patent and Trademark Office filed Sep. 16, 2019.

* cited by examiner

TETRAFLUOROPROPENE-BASED COMPOSITION

FIELD OF THE INVENTION

The present invention relates to tetrafluoropropene-based compositions and to their uses as heat-transfer fluid, in particular in refrigeration, air conditioning and heat pumps.

TECHNICAL BACKGROUND

Fluids based on fluorocarbon compounds are widely used in systems for transfer of heat by vapor compression, in particular air conditioning, heat pump, refrigeration or freezing devices. A feature which these devices have in common is that they are based on a thermodynamic cycle comprising the evaporation of the fluid at low pressure (in which the fluid absorbs heat); the compression of the evaporated fluid up to a high pressure; the condensation of the evaporated fluid to give a liquid at high pressure (in which the fluid discharges heat); and the expansion of the fluid in order to complete the cycle.

The choice of a heat-transfer fluid (which can be a pure compound or a mixture of compounds) is dictated, on the one hand, by the thermodynamic properties of the fluid and, on the other hand, by additional constraints. Thus, a particularly important criterion is that of the impact on the environment of the fluid under consideration. In particular, chlorinated compounds (chlorofluorocarbons and hydrochlorofluorocarbons) exhibit the disadvantage of damaging the ozone layer. Thus, henceforth, nonchlorinated compounds, such as hydrofluorocarbons, fluoroethers and fluoroolefins, are generally preferred to them.

Heat-transfer fluids currently used are HFC-134a, R404a (ternary mixture of 52% HFC-143a, 44% HFC-125 and 4% HFC-134a), R452A (ternary mixture of 11% HFC-32, 59% HFC-125 and 30% HFO-1234yf), R407c (ternary mixture of 52% HFC-134a, 25% HFC-125 and 23% HFC-32), and the like.

However, there exists an ongoing need to develop other heat-transfer fluids exhibiting a lower global warming potential (GWP) than that of the above fluids, and/or exhibiting equivalent and preferably improved performance qualities, and/or exhibiting a small temperature glide at the evaporator, and/or exhibiting a low outlet temperature at the compressor, and/or being nonflammable or only slightly flammable.

DESCRIPTION OF THE INVENTION

The present invention relates to a composition comprising (preferably consisting of):
from 4% to 6% by weight of difluoromethane (HFC-32);
from 2.5% to 3.5% by weight of pentafluoroethane (HFC-125); and
from 91% to 93.5% by weight of tetrafluoropropene.

According to the invention, the percentages by weight are with respect to the total weight of the composition.

The composition according to the invention is such that the total sum of the contents by weight of the tetrafluoropropene, of the difluoromethane (HFC-32) and of the HFC-125 is equal to 100%.

Unless otherwise mentioned, throughout the patent application, the proportions of compounds shown are given as percentages by weight.

In the context of the invention, "HFO-1234yf" refers to 2,3,3,3-tetrafluoropropene. In the context of the invention, "HFO-1234ze" refers to 1,3,3,3-tetrafluoropropene, and includes the cis isomer, the trans isomer and their mixtures.

According to another embodiment, the compositions according to the invention are essentially composed of, preferably consist of:
from 4% to 6% by weight of difluoromethane (HFC-32);
from 2.5% to 3.5% by weight of pentafluoroethane (HFC-125); and
from 91% to 93.5% by weight of tetrafluoropropene.

Impurities can be present in such compositions, in a proportion, for example, of less than 1%, preferably of less than 0.5%, preferably of less than 0.1%, preferentially of less than 0.05% and in particular of less than 0.01%. These impurities do not have a significant impact on the properties of the compositions.

According to one embodiment, the composition according to the invention comprises (preferably consists of):
from 4.5% to 5.5% by weight of difluoromethane;
from 2.5% to 3.5% by weight of pentafluoroethane; and
from 91% to 93% by weight of tetrafluoropropene.

According to a preferred embodiment, the composition according to the invention comprises (preferably consists of):
from 4.5% to 5.5% by weight of difluoromethane;
from 2.5% to 3.5% by weight of pentafluoroethane; and
from 91.5% to 93% by weight of tetrafluoropropene.

According to another embodiment, the composition according to the invention comprises (preferably consists of):
from 4.5% to 5.5% by weight of difluoromethane;
from 2.5% to 3.5% by weight of pentafluoroethane; and
from 91% to 92% by weight of tetrafluoropropene.

According to another embodiment, the composition comprises (preferably consists of):
from 4.5% to 5.5% by weight of difluoromethane;
from 3% to 3.5% by weight of pentafluoroethane; and
from 91% to 92% by weight of tetrafluoropropene.

According to one embodiment, the tetrafluoropropene of the composition is chosen from 1,3,3,3-tetrafluoropropene and 2,3,3,3-tetrafluoropropene; preferably, the tetrafluoropropene is 2,3,3,3-tetrafluoropropene.

According to one embodiment, the composition of the invention is chosen from the group consisting of the following compositions:
5% by weight of difluoromethane, 3.3% by weight of pentafluoroethane and 91.7% by weight of tetrafluoropropene, in particular of 2,3,3,3-tetrafluoropropene;
5% by weight of difluoromethane, 3% by weight of pentafluoroethane and 92% by weight of tetrafluoropropene, in particular of 2,3,3,3-tetrafluoropropene;
5% by weight of difluoromethane, 3.1% by weight of pentafluoroethane and 91.9% by weight of tetrafluoropropene, in particular of 2,3,3,3-tetrafluoropropene;
5% by weight of difluoromethane, 3.2% by weight of pentafluoroethane and 91.8% by weight of tetrafluoropropene, in particular of 2,3,3,3-tetrafluoropropene;
6% by weight of difluoromethane, 3% by weight of pentafluoroethane and 91% by weight of tetrafluoropropene, in particular of 2,3,3,3-tetrafluoropropene;
6% by weight of difluoromethane, 3.1% by weight of pentafluoroethane and 90.9% by weight of tetrafluoropropene, in particular of 2,3,3,3-tetrafluoropropene; and
6% by weight of difluoromethane, 2.5% by weight of pentafluoroethane and 91.5% by weight of tetrafluoropropene, in particular of 2,3,3,3-tetrafluoropropene.

According to one embodiment, the composition according to the invention has a GWP of less than 150, preferably of less than or equal to 140, in particular of less than or equal to 130. The GWP can be calculated according to the instructions provided by the 4$^{th}$ report of the Intergovernmental Panel on Climate Change (IPCC). The GWP of the mixtures is in particular calculated as a function of the concentration by weight and the GWP of each component. The GWP values of the pure compounds are typically listed in the European F-Gas Directive (Regulation (EU) No. 517/2014 of the European Parliament and of the Council, of Apr. 16, 2014).

The compositions according to the invention are advantageously nonflammable or only slightly flammable.

The compositions according to the invention advantageously have a lower flammability limit of greater than 285 g/m$^3$, preferably of greater than or equal to 287 g/m$^3$, in particular of greater than or equal to 290 g/m$^3$.

The composition according to the invention advantageously results in a WCFF composition having a lower flammability limit of greater than 100 g/m$^3$, preferably of greater than or equal to 105 g/m$^3$, in particular of greater than or equal to 110 g/m$^3$.

The compositions according to the invention, the corresponding WCFs and WCFFs, have a heat of combustion (HOC) of less than 19 000 kJ/m$^3$. The heat of combustion according to the invention is defined and determined as indicated in the standard ASHRAE 34-2013.

The "lower flammability limit" is defined in the standard ASHRAE 34-2013 as being the minimum concentration of a composition capable of propagating a flame through a homogeneous mixture of the composition and of air, under test conditions specified in the standard ASTM E681-04. It can be given, for example, in kg/m$^3$ or in % vol.

A "WCF" (worst case of formulation for flammability) composition is defined in the standard ASHRAE 34-2013 as being a composition of formulation for which the flame propagation rate is the highest. This composition is very close to the nominal composition (said nominal composition corresponding, in the context of the invention, to a composition according to the invention) with a degree of tolerance.

A "WCFF" (worst case of fractionation for flammability) composition is defined in the standard ASHRAE 34-2013 as being the composition, the flame propagation rate of which is the highest. This composition is determined following a method well defined in the same standard.

In the context of the present invention, the flammability, the flame propagation rate and the lower flammability limit are defined and determined according to the test appearing in the standard ASHRAE 34-2013, which refers to the standard ASTM E681 as to the equipment used.

As regards the flame propagation rate, the method of the tests described in the standard ASHRAE 34-2013 is that developed in the thesis by T. Jabbour, "Classification de l'inflammabilité des fluides frigorigènes basèe sur la vitesse fondamentale de flamme" [Classification of the flammability of refrigerants based on the fundamental flame velocity] under the direction of Denis Clodic. Thesis, Paris, 2004. The experimental device uses in particular the vertical glass tube method (tube number 2, length 150 cm, diameter 40 cm). The use of two tubes makes it possible to carry out two tests with the same concentration at the same time. The tubes are in particular equipped with tungsten electrodes; the latter are placed at the bottom of each tube, 6.35 mm (¼ inch) apart, and are connected to a 15 kV and 30 mA generator.

The different compositions tested are described as nonflammable or flammable as such, according to the criteria defined in the standard ASHRAE 34-2013.

The composition according to the invention advantageously has a flame propagation rate of less than 2 cm/s, preferably of less than or equal to 1.7 cm/s, preferentially of less than or equal to 1.6 cm/s, advantageously of less than or equal to 1.5 cm/s.

The composition according to the invention is advantageously classified as 2L according to the standard ASHRAE 34-2013. Following this standard, the 2L classification requires a flame propagation rate of less than 10 cm/s.

The compositions according to the invention advantageously exhibit a good compromise between good energy performance qualities, low or zero flammability and low GWP, preferably a GWP of less than 150.

Due to their low flammability, the compositions according to the invention are advantageously safer when they are used as heat-transfer fluids in refrigeration and air conditioning and for heating. In addition, heat-transfer installations (refrigeration, air conditioning, heat pump, and the like) can advantageously comprise higher loads of composition according to the invention, due to their low flammability. As regards the load limits, reference may typically be made to the standard EN378 published in 2008-2009.

The compositions according to the invention can be prepared by any known process, such as, for example, by simple mixing of the different compounds with one another.

Heat-Transfer Composition

According to one embodiment, the composition according to the invention is a heat-transfer fluid.

The present invention also relates to a heat-transfer composition comprising (preferably consisting of) the above-mentioned composition according to the invention and at least one additive chosen in particular from nanoparticles, stabilizing agents, surfactants, tracing agents, fluorescent agents, odorous agents, lubricants and solubilizing agents. Preferably, the additive is chosen from lubricants and in particular lubricants based on polyol esters.

The additives can in particular be chosen from nanoparticles, stabilizing agents, surfactants, tracing agents, fluorescent agents, odorous agents, lubricants and solubilizing agents.

The term "heat-transfer compound", respectively "heat-transfer fluid" or "refrigerant", is understood to mean a compound, respectively a fluid, capable of absorbing heat by evaporating at low temperature and low pressure and of discharging heat by condensing at high temperature and high pressure, in a vapor compression circuit. Generally, a heat-transfer fluid can comprise just one, two, three or more than three heat-transfer compounds.

The term "heat-transfer composition" is understood to mean a composition comprising a heat-transfer fluid and optionally one or more additives which are not heat-transfer compounds for the application envisaged.

The stabilizing agent(s), when they are present, preferably represent at most 5% by weight in the heat-transfer composition. Mention may in particular be made, among stabilizing agents, of nitromethane, ascorbic acid, terephthalic acid, azoles, such as tolutriazole or benzotriazole, phenolic compounds, such as tocopherol, hydroquinone, (t-butyl)hydroquinone or 2,6-di(tert-butyl)-4-methylphenol, epoxides (alkyl, which is optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphonates, thiols and lactones.

Use may in particular be made, as nanoparticles, of charcoal nanoparticles, metal (copper, aluminum) oxides, $TiO_2$, $Al_2O_3$, $MoS_2$, and the like.

Mention may be made, as tracing agents (agents capable of being detected), of deuterated or non-deuterated hydrofluorocarbons, deuterated hydrocarbons, perfluorocarbons, fluoroethers, brominated compounds, iodinated compounds, alcohols, aldehydes, ketones, nitrous oxide and the combinations of these. The tracing agent is different from the heat-transfer compound or compounds making up the heat-transfer fluid.

Mention may be made, as solubilizing agents, of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat-transfer compound or compounds making up the heat-transfer fluid.

Mention may be made, as fluorescent agents, of naphthalimides, perylenes, coumarins, anthracenes, phenanthracenes, xanthenes, thioxanthenes, naphthoxanthenes, fluoresceins and the derivatives and combinations of these.

Mention may be made, as odorous agents, of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and the combinations of these.

In the context of the invention, the terms "lubricant" and "lubricating oil" are used equivalently.

Use may in particular be made, as lubricants, of oils of mineral origin, silicone oils, paraffins of natural origin, naphthenes, synthetic paraffins, alkylbenzenes, poly(α-olefin)s, polyalkylene glycols, polyol esters and/or polyvinyl ethers.

According to one embodiment, the lubricant is based on polyol esters. In particular, the lubricant comprises one or more polyol ester(s).

According to one embodiment, the polyol esters are obtained by reaction of at least one polyol with a carboxylic acid or with a mixture of carboxylic acids.

In the context of the invention, the term "carboxylic acid" covers both a monocarboxylic and polycarboxylic acid, such as, for example, a dicarboxylic acid.

In the context of the invention and unless otherwise mentioned, "polyol" is understood to mean a compound containing at least two hydroxyl (—OH) groups.

Polyol esters A) According to one embodiment, the polyol esters according to the invention correspond to the following formula (I):

$$R^1[OC(O)R^2]_n \qquad (I)$$

in which:
  $R^1$ is a linear or branched hydrocarbon radical, optionally substituted by at least one hydroxyl group and/or comprising at least one heteroatom chosen from the group consisting of —O—, —N— and —S—;
  each $R^2$ is, independently of one another, chosen from the group consisting of:
    i) H;
    ii) an aliphatic hydrocarbon radical;
    iii) a branched hydrocarbon radical;
    iv) a mixture of a radical ii) and/or iii), with an aliphatic hydrocarbon radical comprising from 8 to 14 carbon atoms; and
  n is an integer of at least 2.

In the context of the invention, hydrocarbon radical is understood to mean a radical composed of carbon and hydrogen atoms.

According to one embodiment, the polyols have the following general formula (II):

$$R^1(OH)_n \qquad (II)$$

in which:
  $R^1$ is a linear or branched hydrocarbon radical, optionally substituted by at least one hydroxyl group, preferably by two hydroxyl groups, and/or comprising at least one heteroatom chosen from the group consisting of —O—, —N— and —S—; and
  n is an integer of at least 2.

Preferably, $R^1$ is a linear or branched hydrocarbon radical comprising from 4 to 40 carbon atoms, preferably from 4 to 20 carbon atoms.

Preferably, $R^1$ is a linear or branched hydrocarbon radical comprising at least one oxygen atom.

Preferably, $R^1$ is a branched hydrocarbon radical comprising from 4 to 10 carbon atoms, preferably 5 carbon atoms, substituted by two hydroxyl groups.

According to a preferred embodiment, the polyols comprise from 2 to 10 hydroxyl groups, preferably from 2 to 6 hydroxyl groups.

The polyols according to the invention can comprise one or more oxyalkylene groups; in this specific case, they are polyether polyols.

The polyols according to the invention can also comprise one or more nitrogen atoms. For example, the polyols can be alkanolamines containing from 3 to 6 OH groups. Preferably, the polyols are alkanolamines containing at least two OH groups and preferably at least three.

According to the present invention, the preferred polyols are chosen from the group consisting of ethylene glycol, diethylene glycol, triethylene glycol, propylene glycol, dipropylene glycol, glycerol, neopentyl glycol, 1,2-butanediol, 1,4-butanediol, 1,3-butanediol, pentaerythritol, dipentaerythritol, tripentaerythritol, triglycerol, trimethylolpropane, sorbitol, hexaglycerol and their mixtures. Preferably, the polyol is pentaerythritol or dipentaerythritol.

According to the invention, the carboxylic acids can correspond to the following general formula (III):

$$R^2COOH \qquad (III)$$

in which:
  $R^2$ is chosen from the group consisting of:
    i) H;
    ii) an aliphatic hydrocarbon radical;
    iii) a branched hydrocarbon radical;
    iv) a mixture of a radical ii) and/or iii), with an aliphatic hydrocarbon radical comprising from 8 to 14 carbon atoms.

Preferably, $R^2$ is an aliphatic hydrocarbon radical comprising from 1 to 10, preferentially from 1 to 7, carbon atoms and in particular from 1 to 6 carbon atoms.

Preferably, $R^2$ is a branched hydrocarbon radical comprising from 4 to 20 carbon atoms, in particular from 5 to 14 carbon atoms and preferentially from 6 to 8 carbon atoms.

According to a preferred embodiment, a branched hydrocarbon radical has the following formula (IV):

$$—C(R^3)R^4)(R^5) \qquad (IV)$$

in which $R^3$, $R^4$ and $R^5$ are, independently of one another, an alkyl group, and at least one of the alkyl groups contains at least two carbon atoms. Such branched alkyl groups, once bonded to the carboxyl group, are known under the name "neo group" and the corresponding acid is known as "neo acid". Preferably, $R^3$ and $R^4$ are methyl groups and $R^{10}$ is an alkyl group comprising at least two carbon atoms.

According to the invention, the $R^2$ radical can comprise one or more carboxyl groups or ester groups such as —$COOR^6$, with $R^6$ representing an alkyl or hydroxyalkyl radical or a hydroxyalkyloxyalkyl group.

Preferably, the acid $R^2COOH$ of formula (III) is a monocarboxylic acid.

Examples of carboxylic acids in which the hydrocarbon radical is aliphatic are in particular: formic acid, acetic acid, propionic acid, butyric acid, pentanoic acid, hexanoic acid and heptanoic acid.

Examples of carboxylic acids in which the hydrocarbon radical is branched are in particular: 2-ethyl-n-butyric acid, 2-hexyldecanoic acid, isostearic acid, 2-methylhexanoic acid, 2-methylbutanoic acid, 3-methylbutanoic acid, 3,5,5-trimethylhexanoic acid, 2-ethylhexanoic acid, neoheptanoic acid and neodecanoic acid.

The third type of carboxylic acids which can be used in the preparation of the polyol esters of formula (I) are the carboxylic acids comprising an aliphatic hydrocarbon radical comprising from 8 to 14 carbon atoms. Mention may, for example, be made of: decanoic acid, dodecanoic acid, lauric acid, stearic acid, myristic acid, behenic acid, and the like. Mention may be made, among dicarboxylic acids, of maleic acid, succinic acid, adipic acid, sebacic acid, and the like.

According to a preferred embodiment, the carboxylic acids used to prepare the polyol esters of formula (I) comprise a mixture of monocarboxylic and dicarboxylic acids, the proportion of monocarboxylic acids being predominant. The presence of dicarboxylic acids results in particular in the formation of polyol esters of high viscosity.

In particular, the reaction for the formation of the polyol esters of formula (I) by reaction between the carboxylic acid and the polyols is a reaction catalyzed by an acid. It is in particular a reversible reaction which can be completed by the use of a large amount of acid or by the removal of the water formed during the reaction.

The esterification reaction can be carried out in the presence of organic or inorganic acids, such as sulfuric acid, phosphoric acid, and the like.

Preferably, the reaction is carried out in the absence of catalyst.

The amount of carboxylic acid and of polyol can vary in the mixture according to the results desired. In the specific case where all the hydroxyl groups are esterified, a sufficient amount of carboxylic acid must be added in order to react with all the hydroxyls.

According to one embodiment, during the use of mixtures of carboxylic acids, the latter can react sequentially with the polyols.

According to a preferred embodiment, during the use of a mixture of carboxylic acids, a polyol reacts first with a carboxylic acid, typically the carboxylic acid with the highest molecular weight, followed by the reaction with the carboxylic acid having an aliphatic hydrocarbon chain.

According to one embodiment, the esters can be formed by reaction between the carboxylic acids (or their anhydride or ester derivatives) and the polyols, in the presence of acids at high temperature, while removing the water formed during the reaction. Typically, the reaction can be carried out at a temperature of from 75 to 200° C.

According to another embodiment, the polyol esters formed can comprise hydroxyl groups which have not all reacted; in this case, they are partially esterified polyol esters.

According to a preferred embodiment, the polyol esters are obtained from the alcohol pentaerythritol and from a mixture of carboxylic acids: isononanoic acid, at least one acid having an aliphatic hydrocarbon radical comprising from 8 to 10 carbon atoms, and heptanoic acid. The preferred polyol esters are obtained from pentaerythritol and from a mixture of 70% isononanoic acid, 15% of at least one carboxylic acid having an aliphatic hydrocarbon radical comprising from 8 to 10 carbon atoms, and 15% heptanoic acid. Mention may, for example, be made of the oil Solest 68 sold by CPI Engineering Services Inc.

According to a preferred embodiment, the polyol esters are obtained from the alcohol dipentaerythritol and from a mixture of carboxylic acids: isononanoic acid, at least one acid having an aliphatic hydrocarbon radical comprising from 8 to 10 carbon atoms, and heptanoic acid.

Preferably, the polyol esters of the invention exhibit one of the following formulae (I-A) and (I-B):

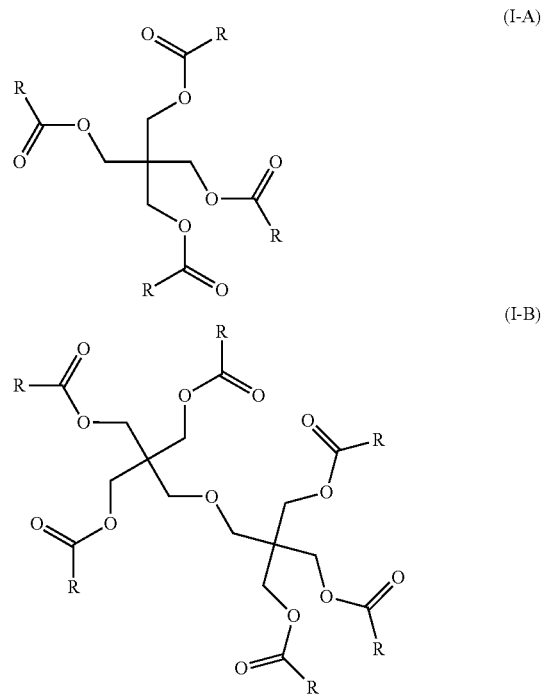

in which each R represents, independently of one another:
  an aliphatic hydrocarbon radical comprising from 1 to 10, preferably from 2 to 9, preferentially from 4 to 9, carbon atoms and in particular from 1 to 6 carbon atoms.
  a branched hydrocarbon radical comprising from 4 to 20 carbon atoms, in particular from 4 to 14 carbon atoms and preferentially from 4 to 9 carbon atoms. In particular, the polyol esters of formula (I-A) or of formula (I-B) comprise different R radicals.

A preferred polyol ester is an ester of formula (I-A) in which R is chosen from:
  an aliphatic hydrocarbon radical comprising 4 carbon atoms; and/or
  an aliphatic hydrocarbon radical comprising 6 carbon atoms; and/or
  an aliphatic hydrocarbon radical comprising 7 carbon atoms; and/or an aliphatic hydrocarbon radical comprising 8 carbon atoms; and/or an aliphatic hydrocarbon radical comprising 9 carbon atoms; and/or a branched hydrocarbon radical comprising 4 carbon atoms; and/or a branched hydrocarbon radical comprising 5 carbon atoms; and/or a branched hydrocarbon radical comprising 7 carbon atoms; and/or a branched hydrocarbon radical comprising 8 carbon atoms; and/or a branched hydrocarbon radical comprising 9 carbon atoms.

A preferred polyol ester is an ester of formula (I-B) in which R is chosen from:

an aliphatic hydrocarbon radical comprising 4 carbon atoms; and/or an aliphatic hydrocarbon radical comprising 6 carbon atoms; and/or an aliphatic hydrocarbon radical comprising 7 carbon atoms; and/or an aliphatic hydrocarbon radical comprising 8 carbon atoms; and/or an aliphatic hydrocarbon radical comprising 9 carbon atoms; and/or a branched hydrocarbon radical comprising 4 carbon atoms; and/or a branched hydrocarbon radical comprising 5 carbon atoms; and/or a branched hydrocarbon radical comprising 7 carbon atoms; and/or a branched hydrocarbon radical comprising 8 carbon atoms; and/or a branched hydrocarbon radical comprising 9 carbon atoms.

Polyol Esters B)

According to another embodiment, the polyol esters of the invention comprise at least one ester of one or more branched carboxylic acids comprising at most 8 carbon atoms. The ester is in particular obtained by reaction of said branched carboxylic acid with one or more polyols.

Preferably, the branched carboxylic acid comprises at least 5 carbon atoms. In particular, the branched carboxylic acid comprises from 5 to 8 carbon atoms and preferentially it contains 5 carbon atoms.

Preferably, the abovementioned branched carboxylic acid does not comprise 9 carbon atoms. In particular, said carboxylic acid is not 3,5,5-trimethylhexanoic acid.

According to a preferred embodiment, the branched carboxylic acid is chosen from 2-methylbutanoic acid, 3-methylbutanoic acid and their mixtures.

According to a preferred embodiment, the polyol is chosen from the group consisting of neopentyl glycol, glycerol, trimethylolpropane, pentaerythritol, dipentaerythritol, tripentaerythritol and their mixtures.

According to a preferred embodiment, the polyol esters are obtained from:

i) a carboxylic acid selected from 2-methylbutanoic acid, 3-methylbutanoic acid and their mixtures; and ii) a polyol chosen from the group consisting of neopentyl glycol, glycerol, trimethylolpropane, pentaerythritol, dipentaerythritol, tripentaerythritol and their mixtures.

Preferably, the polyol ester is that obtained from 2-methylbutanoic acid and pentaerythritol.

Preferably, the polyol ester is that obtained from 2-methylbutanoic acid and dipentaerythritol.

Preferably, the polyol ester is that obtained from 3-methylbutanoic acid and pentaerythritol.

Preferably, the polyol ester is that obtained from 3-methylbutanoic acid and dipentaerythritol.

Preferably, the polyol ester is that obtained from 2-methylbutanoic acid and neopentyl glycol.

Polyol Esters C)

According to another embodiment, the polyol esters according to the invention are poly(neopentyl polyol) esters obtained by:

i) reaction of a neopentyl polyol having the following formula (V):

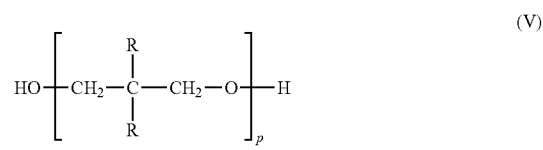

in which:

each R represents, independently of one another, $CH_3$, $C_2H_5$ or $CH_2OH$;

p is an integer ranging from 1 to 4;

with at least one monocarboxylic acid having from 2 to 15 carbon atoms, and in the presence of an acid catalyst, the molar ratio of the carboxyl groups to the hydroxyl groups being less than 1:1, in order to form a partially esterified poly(neopentyl polyol) composition; and ii) reaction of the partially esterified poly(neopentyl polyol) composition obtained on conclusion of stage i) with another carboxylic acid having from 2 to 15 carbon atoms, in order to form the final composition of poly(neopentyl polyol) ester(s).

Preferably, the reaction i) is carried out with a molar ratio ranging from 1:4 to 1:2.

Preferably, the neopentyl polyol has the following formula (VI):

in which each R represents, independently of one another, $CH_3$, $C_2H_5$ or $CH_2OH$.

Preferred neopentyl polyols are those chosen from pentaerythritol, dipentaerythritol, tripentaerythritol, tetraerythritol, trimethylolpropane, trimethylolethane and neopentyl glycol. In particular, the neopentyl polyol is pentaerythritol.

Preferably, a sole neopentyl polyol is used to produce the POE-based lubricant. In some cases, two or more neopentyl polyols are used. This is in particular the case when a commercial pentaerythritol product comprises small amounts of dipentaerythritol, tripentaerythritol and tetraerythritol.

According to a preferred embodiment, the abovementioned monocarboxylic acid comprises from 5 to 11 carbon atoms, preferably from 6 to 10 carbon atoms.

The monocarboxylic acids have in particular the following general formula (VII):

in which R' is a linear or branched C1-C12 alkyl radical, a C6-C12 aryl radical or a C6-C30 aralkyl radical. Preferably, R' is a C4-C10 and preferentially C5-C9 alkyl radical.

In particular, the monocarboxylic acid is chosen from the group consisting of butanoic acid, pentanoic acid, hexanoic acid, heptanoic acid, n-octanoic acid, n-nonanoic acid, n-decanoic acid, 3-methylbutanoic acid, 2-methylbutanoic acid, 2,4-dimethylpentanoic acid, 2-ethylhexanoic acid, 3,3,5-trimethylhexanoic acid, benzoic acid and their mixtures.

According to a preferred embodiment, the monocarboxylic acid is n-heptanoic acid or a mixture of n-heptanoic acid with another linear monocarboxylic acid, in particular n-octanoic and/or n-decanoic acid. Such a monocarboxylic acid mixture can comprise between 15 mol % and 100 mol % of heptanoic acid and between 85 mol % and 0 mol % of other monocarboxylic acid(s). In particular, the mixture comprises between 75 mol % and 100 mol % of heptanoic acid and between 25 mol % and 0 mol % of a mixture of octanoic acid and decanoic acid in a molar ratio of 3:2.

According to a preferred embodiment, the polyol esters comprise:
i) from 45% to 55% by weight of an ester of monopentaerythritol with at least one monocarboxylic acid having from 2 to 15 carbon atoms;
ii) less than 13% by weight of an ester of dipentaerythritol with at least one monocarboxylic acid having from 2 to 15 carbon atoms;
iii) less than 10% by weight of an ester of tripentaerythritol with at least one monocarboxylic acid having from 2 to 15 carbon atoms; and
iv) at least 25% by weight of an ester of tetraerythritol and of other oligomers of pentaerythritol with at least one monocarboxylic acid having from 2 to 15 carbon atoms.

Polyol Esters D)

According to another embodiment, the polyol esters according to the invention have the following formula (VIII):

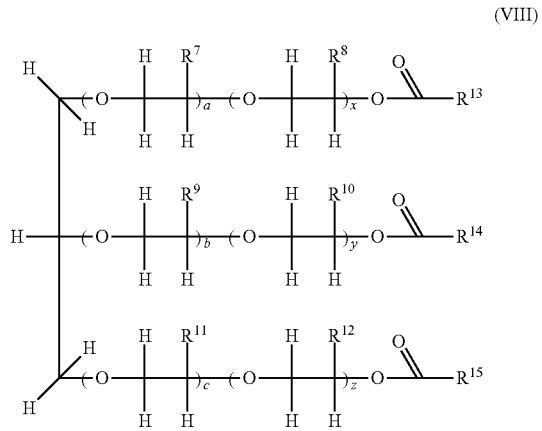

in which:
$R^7$, $R^8$, $R^9$, $R^{10}$, $R^{11}$ and $R^{12}$ are, independently of one another, H or $CH_3$;
a, b, c, y, x and z, are, independently of one another, an integer;
a+x, b+y and c+z are, independently of one another, integers ranging from 1 to 20;
$R^{13}$, $R^{14}$ and $R^{15}$ are, independently of one another, chosen from the group consisting of alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{13}$, $R^{14}$ and $R^{15}$ having from 1 to 17 carbon atoms and being able to be optionally substituted.

According to a preferred embodiment, each of $R^{13}$, $R^{14}$ and $R^{15}$ represents, independently of one another, a linear or branched alkyl group, an alkenyl group or a cycloalkyl group, it being possible for said alkyl, alkenyl or cycloalkyl groups to comprise at least one heteroatom chosen from N, O, Si, F or S. Preferably, each of $R^{13}$, $R^{14}$ and $R^{15}$ has, independently of one another, from 3 to 8 carbon atoms, preferably from 5 to 7 carbon atoms.

Preferably, a+x, b+y and c+z are, independently of one another, integers ranging from 1 to 10, preferably from 2 to 8, and more preferably still from 2 to 4.

Preferably, $R^7$, $R^8$, $R^9$, $R^{10}$, $R^{11}$ and $R^{12}$ represent H.

The polyol esters of formula (VIII) above can typically be prepared as described in sections [0027] to [0030] of the international application WO2012/177742.

In particular, the polyol esters of formula (VIII) are obtained by esterification of glycerol alkoxylates (as described in section [0027] of WO2012/177742) with one or more monocarboxylic acids having from 2 to 18 carbon atoms.

According to a preferred embodiment, the monocarboxylic acids have one of the following formulae:

$R^{13}COOH$ $R^{14}COOH$ and $R^{15}COOH$ in which $R^{13}$, $R^{14}$ and $R^{15}$ are as defined above. Derivatives of the carboxylic acids can also be used, such as anhydrides, esters and acyl halides.

The esterification can be carried out with one or more monocarboxylic acids. Preferred monocarboxylic acids are those chosen from the group consisting of acetic acid, propanoic acid, butyric acid, isobutanoic acid, pivalic acid, pentanoic acid, isopentanoic acid, hexanoic acid, heptanoic acid, octanoic acid, 2-ethylhexanoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, stearic acid, oleic acid, linoleic acid, palmitoleic acid, citronellic acid, undecenoic acid, lauric acid, undecylenic acid, linolenic acid, arachidic acid, behenic acid, tetrahydrobenzoic acid, hydrogenated or nonhydrogenated abietic acid, furoic acid, benzoic acid, 4-acetylbenzoic acid, pyruvic acid, 4-(tert-butyl)benzoic acid, naphthenic acid, 2-methylbenzoic acid, salicylic acid, their isomers, their methyl esters and their mixtures.

Preferably, the esterification is carried out with one or more monocarboxylic acids chosen from the group consisting of pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid and isononanoic acid.

Preferably, the esterification is carried out with one or more monocarboxylic acids chosen from the group consisting of butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecylenic acid, lauric acid, stearic acid, isostearic acid and their mixtures.

According to another embodiment, the polyol esters according to the invention have the following formula (IX):

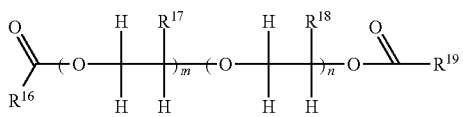

in which:
each of $R^{17}$ and $R^{18}$ is, independently of one another, H or $CH_3$;
each of m and n is, independently of one another, an integer, with m+n being an integer ranging from 1 to 10;
$R^{16}$ and $R^{19}$ are, independently of one another, chosen from the group consisting of alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{16}$ and $R^{19}$ having from 1 to 17 carbon atoms and being able to be optionally substituted.

According to a preferred embodiment, each of $R^{16}$ and $R^{19}$ represents, independently of one another, a linear or branched alkyl group, an alkenyl group or a cycloalkyl group, it being possible for said alkyl, alkenyl or cycloalkyl groups to comprise at least one heteroatom chosen from N, O, Si, F or S. Preferably, each of $R^{16}$ and $R^{19}$ has, independently of one another, from 3 to 8 carbon atoms, preferably from 5 to 7 carbon atoms.

According to a preferred embodiment, each of $R^{17}$ and $R^{18}$ represents H, and/or m+n is an integer ranging from 2 to 8, from 4 to 10, from 2 to 5 or from 3 to 5. In particular, m+n has the value 2, 3 or 4.

According to a preferred embodiment, the polyol esters of formula (IX) above are diesters of triethylene glycol or diesters of tetraethylene glycol, in particular with one or two monocarboxylic acids having from 4 to 9 carbon atoms.

The polyol esters of formula (IX) above can be prepared by esterifications of an ethylene glycol, of a propylene glycol or of an oligo- or polyalkylene glycol (which can be an oligo- or polyethylene glycol, oligo- or polypropylene glycol or an ethylene glycol/propylene glycol block copolymer) with one or two monocarboxylic acids having from 2 to 18 carbon atoms. The esterification can be carried out identically to the esterification reaction carried out in order to prepare the polyol esters of formula (VIII) above.

In particular, monocarboxylic acids identical to those used to prepare the polyol esters of formula (VIII) above can be used to form the polyol esters of formula (IX).

According to one embodiment, the lubricant based on polyol esters according to the invention comprises from 20% to 80%, preferably from 30% to 70% and preferentially from 40% to 60% by weight of at least one polyol ester of formula (VIII) and from 80% to 20%, preferably from 70% to 30% and preferentially from 60% to 40% by weight of at least one polyol ester of formula (IX).

Generally, some alcohol functional groups may not be esterified during the esterification reaction; however, their proportion remains low. Thus, the POEs can comprise between 0 relative mol % and 5 relative mol % of $CH_2OH$ units, with respect to the —$CH_2$—O—C(=O)— units.

The POE lubricants preferred according to the invention are those having a viscosity of 1 to 1000 centiStokes (cSt) at 40° C., preferably of 10 to 200 cSt, more preferentially still of 20 to 100 cSt and advantageously of 30 to 80 cSt.

The international classification of oils is in particular given by the standard ISO3448-1992 (NF T60-141), according to which the oils are designated by their class of mean viscosity measured at the temperature of 40° C.

Uses

The composition according to the present invention is very particularly suitable as heat-transfer fluid in refrigeration and air conditioning and for heating, and preferably in refrigerated transport, air conditioning and heating in motor vehicles.

The present invention relates to the use of the composition according to the invention to reduce the risks of ignition and/or of explosion in the event of escape of refrigerant.

The low flammability of the composition advantageously makes it possible to use it in greater amounts in heat-transfer installations. The use of refrigerants according to the flammability classes is described in particular in the standard ISO 5149-1 (2014 version).

The present invention also relates to the use of a composition according to the invention or of a heat-transfer composition according to the invention in a heat-transfer system containing a vapor compression circuit.

According to one embodiment, the heat-transfer system is:
an air conditioning system; or
a refrigeration system; or
a freezing system; or
a heat pump system.

The present invention also relates to a heat-transfer process based on the use of a heat-transfer installation containing a vapor compression circuit which comprises the composition according to the invention or the heat-transfer composition according to the invention. The heat-transfer process can be a process for heating or cooling a fluid or a body.

The composition according to the invention or the heat-transfer composition can also be used in a process for the production of mechanical work or of electricity, in particular in accordance with a Rankine cycle.

The invention also relates to a heat-transfer installation comprising a vapor compression circuit containing the composition according to the invention or the heat-transfer composition according to the invention.

According to one embodiment, this installation is chosen from mobile or stationary installations for refrigeration, for heating (heat pump), for air conditioning and for freezing, and heat engines.

It can in particular be a heat pump installation, in which case the fluid or body which is heated (generally air and optionally one or more products, objects or organisms) is located in a room or a vehicle passenger compartment (for a mobile installation). According to a preferred embodiment, it is an air conditioning installation, in which case the fluid or body which is cooled (generally air and optionally one or more products, objects or organisms) is located in a room or a vehicle passenger compartment (for a mobile installation). It can be a refrigeration installation or a freezing installation (or cryogenic installation), in which case the fluid or body which is cooled generally comprises air and one or more products, objects or organisms located in a room or a container.

According to one embodiment, the heat-transfer installation is an installation, the electrical power of which is less than or equal to 50 kW, preferably less than or equal to 30 kW, particularly less than or equal to 22 kW and more particularly less than or equal to 10 kW and more specifically less than or equal to 2 kW. Mention may be made, as application in commercial cold, for example, of refrigerated display cabinets, cold rooms, ice machines, and the like; mention may be made, as application in heating, for example, of heat pumps, air/air heat pumps, air/water heat pumps, hot water heat pump, and the like; mention may be made, as application in residential air conditioning, for example, of mono-split installations, multi-split installations, central air distribution installations, variable refrigerant volume installations, and the like; mention may be made, for example, as application in mobile air conditioning, of heat pumps and motor vehicle air conditioning.

According to one embodiment, the heat-transfer installation comprises at least one air/refrigerant heat exchanger, in which the refrigerant is the composition according to the invention.

According to one embodiment, the heat-transfer installation comprises at least one positive displacement piston compressor.

Another subject matter of the invention is a process for heating or cooling a fluid or a body by means of a vapor compression circuit containing a heat-transfer fluid or a heat-transfer composition, said process successively comprising the evaporation of the heat-transfer fluid or composition, the compression of the heat-transfer fluid or composition, the condensation of the heat-transfer fluid or composition and the expansion of the heat-transfer fluid or composition, in which the heat-transfer fluid is the composition according to the invention, or the heat-transfer composition is that described above.

Another subject matter of the invention is a process for the production of electricity by means of a heat engine, said process successively comprising the evaporation of the heat-transfer fluid or of a heat-transfer composition, the expansion of the heat-transfer fluid or composition in a turbine, making it possible to generate electricity, the condensation of the heat-transfer fluid or composition and the compression of the heat-transfer fluid or composition, in which the heat-transfer fluid is the composition according to the invention and the heat-transfer composition is that described above.

The vapor compression circuit, containing a heat-transfer fluid or composition according to the invention, comprises at least one evaporator, one compressor, preferably a positive displacement piston compressor, one condenser and one expansion valve, and also lines for transporting the heat-transfer fluid or composition between these elements. The evaporator and the condenser comprise a heat exchanger which makes possible an exchange of heat between the heat-transfer fluid or composition and another fluid or body. Preferably, the heat exchanger is an air/refrigerant exchanger.

The evaporator used in the context of the invention can be a dry expansion evaporator or a flooded evaporator. In a dry expansion evaporator, all of the abovementioned heat-transfer fluid or composition is evaporated at the outlet of the evaporator, and the vapor phase is superheated.

In a flooded evaporator, the heat-transfer fluid/composition in liquid form does not completely evaporate. A flooded evaporator comprises a separator of liquid phase and of vapor phase.

Use may in particular be made, as compressor, of a single-stage or multistage centrifugal compressor or of a mini centrifugal compressor. Rotary, reciprocating or screw compressors can also be used. Preferably, the heat-transfer installations comprise at least one positive displacement piston compressor.

According to another embodiment, the vapor compression circuit comprises a screw compressor, preferably a twin-screw or single-screw compressor. In particular, the vapor compression circuit comprises a twin-screw compressor, which can employ a sizeable oil stream, for example up to 6.3 l/s.

A centrifugal compressor is characterized in that it uses rotating elements to radially accelerate the heat-transfer fluid or composition; it typically comprises at least one rotor and one diffuser housed in a chamber. The heat-transfer fluid or the heat-transfer composition is introduced at the center of the rotor and circulates towards the periphery of the rotor while undergoing acceleration. Thus, on the one hand, the static pressure increases in the rotor and above all, on the other hand, at the diffuser; the velocity is converted into an increase in the static pressure. Each rotor/diffuser assembly constitutes a stage of the compressor. Centrifugal compressors can comprise from 1 to 12 stages, according to the final pressure desired and the volume of fluid to be treated. The degree of compression is defined as being the ratio of the absolute pressure of the heat-transfer fluid/composition at the outlet to the absolute pressure of said fluid or of said composition at the inlet. The rotational speed for large centrifugal compressors ranges from 3000 to 7000 revolutions per minute. Small centrifugal compressors (or mini centrifugal compressors) generally operate at a rotational speed which ranges from 40 000 to 70 000 revolutions per minute and comprise a small-sized rotor (generally less than 0.15 m). Use may be made of a multistage rotor in order to improve the efficiency of the compressor and to limit the energy cost (in comparison with a single-stage rotor). For a two-stage system, the outlet of the first stage of the rotor feeds the inlet of the second rotor. The two rotors can be mounted on a single axis. Each stage can provide a compression ratio of the fluid of approximately 4 to 1, that is to say that the absolute outlet pressure can be equal to approximately four times the absolute suction pressure. Examples of two-stage centrifugal compressors, in particular for motor vehicle applications, are described in the documents U.S. Pat. Nos. 5,065,990 and 5,363,674.

The centrifugal compressor can be driven by an electric motor or by a gas turbine (for example fed by the exhaust gases of a vehicle, for mobile applications) or by gearing.

The installation can comprise a coupling of the expansion valve with a turbine in order to generate electricity (Rankine cycle).

The installation can also optionally comprise at least one heat-exchange fluid circuit used to transmit the heat (with or without change of state) between the circuit of the heat-transfer fluid or of the heat-transfer composition and the fluid or body to be heated or cooled.

The installation can also optionally comprise two (or more) vapor compression circuits containing identical or distinct heat-transfer fluids/compositions. For example, the vapor compression circuits can be coupled to one another.

The vapor compression circuit operates according to a conventional vapor compression cycle. The cycle comprises the change of state of the heat-transfer fluid/composition from a liquid phase (or liquid/vapor dual phase) to a vapor phase at a relatively low pressure, then the compression of the fluid/composition in the vapor phase up to a relatively high pressure, the change of state (condensation) of the heat-transfer fluid/composition from the vapor phase to the liquid phase at a relatively high pressure, and the reduction of the pressure in order to restart the cycle.

In the case of a cooling process, heat resulting from the fluid or from the body which is being cooled (directly or indirectly, via a heat-exchange fluid) is absorbed by the heat-transfer fluid/composition, during the evaporation of the latter, this being carried out at a relatively low temperature with respect to the surroundings. The cooling processes comprise air conditioning processes (with mobile installations, for example in vehicles, or stationary installations), refrigeration processes and freezing processes or cryogenics processes. In the field of air conditioning, mention may be made of domestic, commercial or industrial air conditioning, where the items of equipment used are either chillers or direct expansion items of equipment. In the field of refrigeration, mention may be made of domestic or commercial refrigeration, cold rooms, the food industry or refrigerated transport (trucks, ships, containers).

In the case of a heating process, heat is transferred (directly or indirectly, via a heat-exchange fluid) from the heat-transfer fluid/composition, during the condensation of the latter, to the fluid or to the body which is being heated, this being carried out at a relatively high temperature with respect to the surroundings. The installation which makes it possible to carry out the transfer of heat is known, in this case, as "heat pump". They can in particular be medium- and high-temperature heat pumps.

It is possible to use any type of heat exchanger for the employment of the compositions according to the invention or heat-transfer compositions according to the invention, and in particular cocurrent heat exchangers or, preferably, countercurrent heat exchangers. Exchangers of air/refrigerant type can also be used and are moreover preferred.

According to the invention, the term "countercurrent heat exchanger" is understood to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in cross-current mode with a countercurrent tendency are also included among the countercurrent heat exchangers within the meaning of the present patent application.

However, according to a preferred embodiment, the invention provides for the cooling and heating processes, and the corresponding installations, to comprise an air/refrigerant heat exchanger, either at the condenser or at the evaporator. This is because the compositions according to the invention or heat-transfer compositions which are defined above are particularly effective with these heat exchangers.

In "low-temperature refrigeration" processes, the inlet temperature of the composition according to the invention or heat-transfer composition at the evaporator is preferably from −45° C. to −15° C., in particular from −40° C. to −20° C., more particularly preferably from −35° C. to −25° C. and, for example, of approximately −30° C. or −20° C.; and the temperature of the beginning of the condensation of the composition according to the invention or heat-transfer composition at the condenser is preferably from 25° C. to 80° C., in particular from 30° C. to 60° C., more particularly preferably from 35° C. to 55° C. and, for example, of approximately 40° C.

In "moderate-temperature cooling" processes, the inlet temperature of the composition according to the invention or heat-transfer composition at the evaporator is preferably from −20° C. to 10° C., in particular from −15° C. to 5° C., more particularly preferably from −10° C. to 0° C. and, for example, of approximately −5° C.; and the temperature of the beginning of the condensation of the composition according to the invention or heat-transfer composition at the condenser is preferably from 25° C. to 80° C., in particular from 30° C. to 60° C., more particularly preferably from 35° C. to 55° C. and, for example, of approximately 50° C. These processes can be refrigeration or air conditioning processes.

In "moderate-temperature heating" processes, the inlet temperature of the composition according to the invention or heat-transfer composition at the evaporator is preferably from −20° C. to 10° C., in particular from −15° C. to 5° C., more particularly preferably from −10° C. to 0° C. and, for example, of approximately −5° C.; and the temperature of the beginning of the condensation of the composition according to the invention or heat-transfer composition at the condenser is preferably from 25° C. to 80° C., in particular from 30° C. to 60° C., more particularly preferably from 35° C. to 55° C. and, for example, of approximately 50° C.

The composition according to the present invention can be used to replace various heat-transfer fluids in various heat-transfer applications. For example, the compositions according to the invention can be used to replace R404A, R452A, R22, R134a, R245fa, R152a, R422, R502, R407A, R407F, R407C, R1234yf or R1234ze.

In some embodiments, the invention provides compositions which exhibit energy performance qualities which are equivalent or improved in comparison with usual heat-transfer fluids, in particular in comparison with R404A or with R452A.

In some embodiments, the compositions of the invention in particular exhibit a performance coefficient which is equivalent or improved in comparison with the compositions of the state of the art. In particular, the compositions according to the invention advantageously exhibit a better performance coefficient than R404 or R452A.

According to one embodiment, the compositions according to the invention advantageously have an outlet temperature of the compressor which is lower than that of the usual heat-transfer fluids, such as, for example, R404A or R452A.

In some embodiments, the replacement of R404A or R452A can advantageously be carried out without modifying the heat-transfer installation or its operating parameters. In particular, the replacement of R404A or R452A can be carried out without modifying the technology of the compressors.

Thus, the compositions according to the invention advantageously make possible a replacement of R404A or R452A without modifying or virtually without modifying the heat-transfer installation or its operating parameters.

Correspondingly, the compositions according to the invention are particularly appropriate for all applications in which R404A or R452A are generally used. The compositions of the invention are thus particularly appropriate for refrigerated transport applications and in particular refrigerated containers, motor vehicle air conditioning or motor vehicle heating.

The compositions according to the invention advantageously exhibit a small temperature glide at the evaporator, in particular a temperature glide which is less than that obtained with R452A. Preferably, the temperature glide is less than 3° C., preferably less than or equal to 2.6° C., in particular for a temperature at the evaporator of −30° C.

The compositions according to the invention advantageously exhibit a pressure at the evaporator of greater than 1 bar for a temperature at the evaporator of −30° C., which advantageously makes it possible to limit the infiltration of air into the evaporator and thus to prevent corrosion phenomena and the degradation of the components, such as the compressor, exchanger and expansion valve.

All the embodiments described above can be combined with one another. In particular, the abovementioned uses can be applied to all the embodiments of the compositions of the invention.

In the context of the invention, the term "between x and y" or "from x to y" is understood to mean an interval in which the limits x and y are included. For example, the range "between 1% and 2%" includes in particular the values 1% and 2%.

The following examples illustrate the invention without, however, limiting it.

fluid at the outlet of the condenser, "Pevap" denotes the pressure of the fluid in the evaporator, "Pcond" denotes the pressure of the fluid in the condenser, "Tglide at the evap" denotes the temperature glide at the evaporator, "isentropic eff" denotes the efficiency of the compressor, "% COP/R452A" denotes the coefficient of performance of the fluid with respect to the reference fluid R452A.

COP: coefficient of performance and is defined, when a refrigeration system is concerned, as being the useful cold power provided by the system to the power contributed or consumed by the system.

Isentropic efficiency of the compressor: this is the ratio of the actual energy transmitted to the fluid to the isentropic energy.

Example 1A

Let there be a low-temperature refrigeration installation which operates between a mean evaporation temperature at −30° C., a mean condensation temperature at 35° C., a superheating of 10° C. and a subcooling of 5° C. The isentropic efficiency of the compressor is 60%.

| GWP | R32 | HFO-1234yf | HFC-125 | $T_{vap\ sat\ evap}$ (° C.) | $T_{compressor\ outlet}$ (° C.) | $T_{liq\ sat\ condenser}$ (° C.) | $P_{evap}$ (bar) | $P_{cond}$ (bar) | Pressure ratio | $T_{glide\ at\ the\ evap}$ (° C.) | Isentropic eff | % COP/R452A | |
|---|---|---|---|---|---|---|---|---|---|---|---|---|---|
| | | R452A | | −29 | 81.5 | 33 | 1.95 | 16 | 8.3 | 2.5 | 60 | 100 | |
| 140 | 5.0 | 92.0 | 3.0 | −29 | 74.6 | 32 | 1.15 | 11 | 9.2 | 1.9 | 60 | 103 | invention |
| 143 | 5.0 | 91.9 | 3.1 | −29 | 74.6 | 32 | 1.15 | 11 | 9.2 | 1.9 | 60 | 103 | invention |
| 147 | 5.0 | 91.8 | 3.2 | −29 | 74.6 | 32 | 1.15 | 11 | 9.2 | 2.0 | 60 | 103 | invention |
| 150 | 5.0 | 91.7 | 3.3 | −29 | 74.6 | 32 | 1.15 | 11 | 9.2 | 2.0 | 60 | 103 | invention |
| 146 | 6.0 | 91.0 | 3.0 | −29 | 76.1 | 32 | 1.18 | 11 | 9.2 | 2.3 | 60 | 103 | invention |
| 150 | 6.0 | 90.9 | 3.1 | −29 | 76.1 | 32 | 1.18 | 11 | 9.2 | 2.3 | 60 | 103 | invention |
| 402 | 18.0 | 74.0 | 8.0 | −28 | 88.6 | 32 | 1.57 | 14 | 8.8 | 4.7 | 60 | 103 | comparative |

EXPERIMENTAL PART

In the tables which follow, "Tvap sat evap" denotes the temperature of the vapor saturated fluid at the outlet of the evaporator, "T compressor outlet" denotes the temperature of the fluid at the outlet of the compressor, "T liq sat condenser" denotes the temperature of the liquid saturated

Example 1B

Let there be a low-temperature refrigeration installation which operates between a mean evaporation temperature at −30° C., a mean condensation temperature at 45° C., a superheating of 10° C. and a subcooling of 5° C. The isentropic efficiency of the compressor is 60%.

| GWP | R32 | HFO-1234yf | HFC-125 | $T_{vap\ sat\ evap}$ (° C.) | $T_{compressor\ outlet}$ (° C.) | $T_{liq\ sat\ condenser}$ (° C.) | $P_{evap}$ (bar) | $P_{cond}$ (bar) | Pressure ratio | $T_{glide\ at\ the\ evap}$ (° C.) | Isentropic eff | % COP/R452A | |
|---|---|---|---|---|---|---|---|---|---|---|---|---|---|
| | | R452A | | −29 | 94.2 | 43 | 1.91 | 21 | 10.8 | 2.2 | 60 | 100 | |
| 140 | 5.0 | 92.0 | 3.0 | −29 | 85.8 | 43 | 1.15 | 14 | 11.8 | 1.5 | 60 | 106 | invention |
| 143 | 5.0 | 91.9 | 3.1 | −29 | 85.9 | 43 | 1.15 | 14 | 11.8 | 1.5 | 60 | 106 | invention |
| 147 | 5.0 | 91.8 | 3.2 | −29 | 85.9 | 43 | 1.15 | 14 | 11.8 | 1.5 | 60 | 106 | invention |
| 150 | 5.0 | 91.7 | 3.3 | −29 | 85.9 | 43 | 1.15 | 14 | 11.8 | 1.6 | 60 | 106 | invention |
| 140 | 5.0 | 92.0 | 3.0 | −29 | 85.8 | 43 | 1.15 | 14 | 11.8 | 1.5 | 60 | 106 | invention |

-continued

| | | | T$_{compressor}$ outlet (° C.) | T$_{liq\ sat\ condenser}$ (° C.) | P$_{evap}$ (bar) | P$_{cond}$ (bar) | Pressure ratio | T$_{glide\ at\ the\ evap}$ (° C.) | Isentropic eff | % COP/ R452A | |
|---|---|---|---|---|---|---|---|---|---|---|---|
| | | | T$_{vap\ sat\ evap}$ (° C.) | | | | | | | | |
| 146 | 6.0 | 91.0 | 3.0 | −29 | 87.6 | 43 | 1.16 | 14 | 12.0 | 1.8 | 60 | 105 | invention |
| 150 | 6.0 | 90.9 | 3.1 | −29 | 87.7 | 43 | 1.16 | 14 | 12.0 | 1.8 | 60 | 105 | invention |
| 402 | 18.0 | 74.0 | 8.0 | −28 | 101.4 | 42 | 1.55 | 18 | 11.4 | 4.0 | 60 | 106 | comparative |

Example 1C

Let there be a low-temperature refrigeration installation which operates between a mean evaporation temperature at −30° C., a mean condensation temperature at 55° C., a superheating of 10° C. and a subcooling of 5° C. The isentropic efficiency of the compressor is 60%.

| | | | | T$_{vap\ sat\ evap}$ (° C.) | T$_{compressor\ outlet}$ (° C.) | T$_{liq\ sat\ condenser}$ (° C.) | P$_{evap}$ (bar) | P$_{cond}$ (bar) | Pressure ratio | T$_{glide\ at\ the\ evap}$ (° C.) | Isentropic eff | % COP/ R452A | |
|---|---|---|---|---|---|---|---|---|---|---|---|---|---|
| | | R452A | | −29 | 106.3 | 54 | 1.91 | 26 | 13.7 | 1.9 | 60 | 100 | |
| GWP | R32 | HFO-1234yf | HFC-125 | | | | | | | | | | |
| 140 | 5.0 | 92.0 | 3.0 | −29 | 96.6 | 53 | 1.14 | 17 | 15.1 | 1.2 | 60 | 109 | invention |
| 143 | 5.0 | 91.9 | 3.1 | −29 | 96.6 | 53 | 1.14 | 17 | 15.1 | 1.2 | 60 | 109 | invention |
| 147 | 5.0 | 91.8 | 3.2 | −29 | 96.6 | 53 | 1.14 | 17 | 15.1 | 1.2 | 60 | 109 | invention |
| 150 | 5.0 | 91.7 | 3.3 | −29 | 96.6 | 53 | 1.14 | 17 | 15.1 | 1.2 | 60 | 109 | invention |
| 146 | 6.0 | 91.0 | 3.0 | −29 | 98.3 | 53 | 1.16 | 18 | 15.1 | 1.4 | 60 | 108 | invention |
| 150 | 6.0 | 90.9 | 3.1 | −29 | 98.3 | 53 | 1.16 | 18 | 15.1 | 1.4 | 60 | 108 | invention |
| 402 | 18.0 | 74.0 | 8.0 | −28 | 113.8 | 52 | 1.53 | 22 | 14.6 | 3.4 | 60 | 109 | comparative |

It emerges from examples 1A to 1C that the compositions of the invention advantageously have a better coefficient of performance COP than R452A.

In addition, the compositions of the invention advantageously have a lower outlet temperature of the compressor than that of R452A. Thus, the compositions according to the invention can make it possible to replace R452A without modifying the technology of the compressors.

Furthermore, the results show that the compositions according to the invention advantageously exhibit a small temperature glide at the evaporator, in particular a temperature glide which is less than that obtained with R452A. This is advantageously reflected by better heat exchange performance qualities for the compositions according to the invention and in particular in installations using at least one refrigerant/air exchanger. More particularly, the compositions of the invention result in a temperature glide at the evaporator of less than 3° C., preferably of less than or equal to 2.5° C., in particular for a temperature at the evaporator of −30° C.

The compositions according to the invention advantageously exhibit a pressure at the evaporator of greater than 1 bar, for a temperature at the evaporator of −30° C., which advantageously makes it possible to limit the infiltration of air into the evaporator and thus to prevent corrosion phenomena and the degradation of the components, such as the compressor, exchanger and expansion valve.

The invention claimed is:

1. A composition comprising:
   from 4% to 6% by weight of difluoromethane;
   from 2.5% to 3.5% by weight of pentafluoroethane; and
   from 91% to 93.5% by weight of tetrafluoropropene.

2. The composition as claimed in claim 1, comprising:
   from 4.5% to 5.5% by weight of difluoromethane;
   from 2.5% to 3.5% by weight of pentafluoroethane; and
   from 91% to 93% by weight of tetrafluoropropene.

3. The composition as claimed in claim 1, comprising:
   from 4.5% to 5.5% by weight of difluoromethane;
   from 2.5% to 3.5% by weight of pentafluoroethane; and
   from 91.5% to 93% by weight of tetrafluoropropene.

4. The composition as claimed in claim 1, comprising:
   from 4.5% to 5.5% by weight of difluoromethane;
   from 3% to 3.5% by weight of pentafluoroethane; and
   from 91% to 92% by weight of tetrafluoropropene.

5. The composition as claimed in claim 1, in which the tetrafluoropropene is 1,3,3,3-tetrafluoropropene.

6. The composition as claimed in claim 1, in which the tetrafluoropropene is 2,3,3,3-tetrafluoropropene.

7. The composition as claimed in claim 1, chosen from the group consisting of:
   5% by weight of difluoromethane, 3.3% by weight of pentafluoroethane and 91.7% by weight of tetrafluoropropene;
   5% by weight of difluoromethane, 3% by weight of pentafluoroethane and 92% by weight of tetrafluoropropene;
   5% by weight of difluoromethane, 3.1% by weight of pentafluoroethane and 91.9% by weight of tetrafluoropropene;
   5% by weight of difluoromethane, 3.2% by weight of pentafluoroethane and 91.8% by weight of tetrafluoropropene;
   6% by weight of difluoromethane, 3% by weight of pentafluoroethane and 91% by weight of tetrafluoropropene; and
   6% by weight of difluoromethane, 2.5% by weight of pentafluoroethane and 91.5% by weight of tetrafluoropropene.

8. The composition as claimed in claim 1, having a GWP of less than 150.

9. The composition as claimed in claim 1, wherein it has a lower flammability limit of greater than 285 g/m$^3$.

10. The composition as claimed in claim 1, wherein it has a flame propagation rate of less than 2 cm/s.

11. A method for replacing R404A, R452A, R22, R134a, R245fa, R152a, R422, R502, R407A, R407F, R407C, R1234yf or R1234ze in a heat-transfer system, comprising replacing R404A, R452A, R22, R134a, R245fa, R152a, R422, R502, R407A, R407F, R407C, R1234yf or R1234ze with the composition as claimed in claim 1.

12. A heat-transfer composition comprising the composition as claimed in claim 1 and at least one additive chosen from nanoparticles, stabilizing agents, surfactants, tracing agents, fluorescent agents, odorous agents, lubricants, and solubilizing agents.

13. A heat-transfer system containing a vapor compression circuit containing the composition as claimed in claim 1, wherein the system is in refrigerated transport, in motor vehicle air conditioning or in motor vehicle heating.

14. A heat-transfer installation comprising a vapor compression circuit containing the composition as claimed in claim 1.

15. The heat-transfer installation as claimed in claim 14, chosen from installations comprising an electrical power of less than or equal to 50 kW, installations comprising at least one refrigerant/air heat exchanger and installations comprising at least one positive displacement piston compressor.

16. A process for heating or cooling a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the heat-transfer fluid is a composition as claimed in claim 1.

17. The process as claimed in claim 16, chosen from:
   a process for cooling a fluid or a body, in which the temperature of the cooled fluid or body is from −40° C. to −10° C.;
   a process for cooling a fluid or a body, in which the temperature of the cooled fluid or body is from −15° C. to 15° C.; and
   a process for heating a fluid or a body, in which the temperature of the heated fluid or body is from 30° C. to 80° C.

\* \* \* \* \*